May 9, 1933.   A. A. ROSS   1,908,187
METHOD OF MANUFACTURING METALLIC GEAR WHEELS
Filed April 18, 1930

STEEL RIM OF HIGH CARBON CONTENT

STEEL WEB AND HUB OF LOW CARBON CONTENT.

Inventor:
Aubrey A. Ross,
by Charles E. Tullar
His Attorney.

Patented May 9, 1933

1,908,187

UNITED STATES PATENT OFFICE

AUBREY A. ROSS, OF MARBLEHEAD, MASSACHUSETTS, ASSIGNOR TO GENERAL ELECTRIC COMPANY, A CORPORATION OF NEW YORK

METHOD OF MANUFACTURING METALLIC GEAR WHEELS

Application filed April 18, 1930. Serial No. 445,454.

The present invention relates to metallic gear wheels and especially to metallic gear wheels wherein it is required, due to the service for which the gear wheels are intended, that they be heat treated after the teeth are cut on the rim to harden the teeth. Such service is met with, for example, in the case of railway motor gear wheels.

The object of my invention is to provide an improved method of manufacturing metallic gear wheels. For a consideration of what I believe to be novel and my invention, attention is directed to the following specification and to the claim appended thereto.

Figure 1:
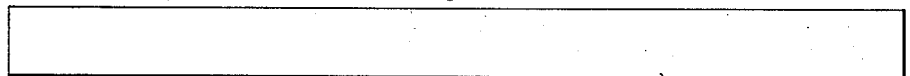
Figure 2:
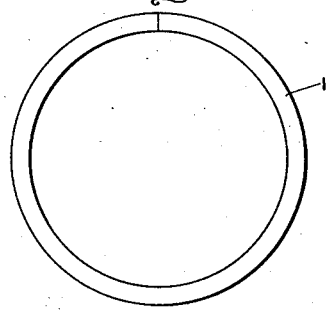
Figure 3:
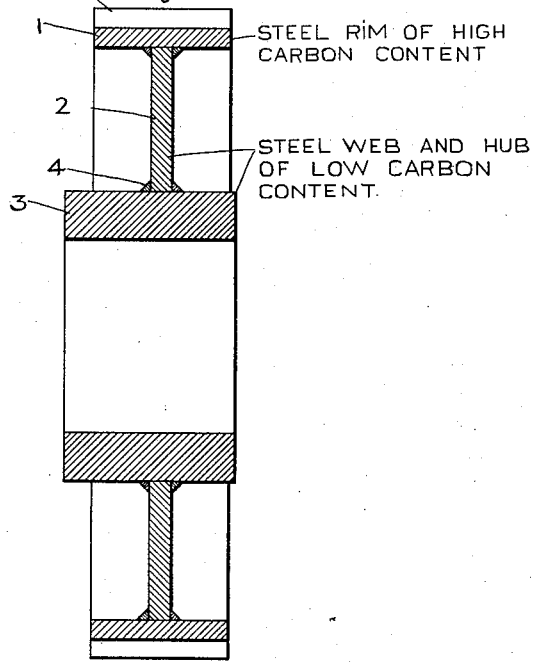

In the drawing, Fig. 1 shows a bar of steel used in forming the rim of my improved gear wheel; Fig. 2 shows the way in which the bar of Fig. 1 is rolled to form a rim, and Fig. 3 shows a complete gear wheel.

According to my invention, I take a strip or bar of steel 1, as shown in Fig. 1, of homogeneous structure and having chemical characteristics such that it is capable of being later case hardened or hardened by heating to a predetermined temperature and quenching in a suitable quenching medium, roll it into a ring as shown in Fig. 2 to bring the two ends together and then unite the abutting ends to each other through their entire area by resistance welding, either resistance butt welding or resistance flash welding. I have discovered that by uniting the ends in this manner by resistance welding, I obtain a ring wherein the material at the weld has the same characteristics and the same carbon content as the remainder of the ring. In other words, I obtain a ring entirely uniform in its characteristics the same as if it were formed from a continuous piece of material without the weld. As a result, I may utilize the ring for the rim of the gear wheel, cutting teeth therein, with the assurance that after the teeth are cut and the rim heat treated, all the teeth will be uniform in hardness, a tooth or teeth at the weld being exactly similar to the remaining teeth. As already stated, this result is obtained by using resistance welding for uniting the ends of the ring to each other, and I consider this as being one important feature of my invention. With the ends of the rim completely united, no attention need be paid to the weld in cutting teeth into the rim. The teeth may be provided so that one of them coincides with or is located adjacent the welded portion. This is an advantage of my gear wheel over structures in which the inner portion only of the rim has been united by welding, which made it necessary to provide the teeth so that two of them were located adjacent the welded portion. Preferably for forming the rim, I use steel of relatively high carbon content, it being understood that by this term I mean a carbon content such that, with the method of hardening to be used, a rim of the desired hardness results.

For use with the ring 1 formed from homogeneous steel of suitable chemical characteristics and united by resistance welding, I provide a web 2 and a hub 3 made from steel of low carbon content, for example, carbon content of the order of .15 to .30 of 1%. The web 2 may be in the form of a solid plate or it may be in the form of a ring of spokes as found desirable, it being understood that by the term web I intend to include any suitable connecting structure between the hub and the rim. The rim, web and hub are assembled as shown in Fig. 3 to form a gear wheel and they are united to each other by welding as is indicated at 4.

After the structure has been fabricated, and before the gear wheel is heat treated, I cut teeth on the rim as is indicated at 5. Following this, the gear wheel is heat treated in the usual manner to harden the teeth. In connection with the heat treating operation, it is required that while the treatment of the rim be such that the teeth are hardened to a high degree, the hub be kept sufficiently soft so that it can be machined and bored after the heat treatment is completed, is being necessary usually to rebore the hub after the gear wheel is heat treated to overcome warpage or to bring it to size to fit the shaft on which it is to be used. In the case of a gear wheel formed entirely from the same material, that is, from steel of high carbon content, it is necessary during the heat treatment to protect the hub so that it does not become hardened to the extent to which the rim becomes hardened. This is accomplished usually by plugging the bore with fire clay and by putting caps on the ends of the hub so as to hold the heat during quenching. By my construction, wherein I can utilize a rim formed from steel of medium or high carbon content and a hub formed from steel of low carbon content, I am enabled to avoid these manufacturing complications in that, due to the low carbon content of material from which the hub is made, it will not become too hard to be machined during the heat treatment.

By my invention, I provide a method of manufacturing a metallic gear wheel by which a wheel can be readily fabricated and produced at low cost. At the same time, I provide one wherein it is assured that the ring forming the rim is of uniform content throughout.

While I have shown my invention as being carried out in connection with a railway gear wheel of the solid type, it will be understood that the invention is equally applicable to railway gear wheels of the split type or to other types of gear wheels.

In accordance with the provision of the patent statutes, I have described the principle of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States, is:

The method of manufacturing a gear wheel which method comprises bending a strip of high carbon content steel to form a ring, uniting the abutting end surfaces of the ring through their entire areas by resistance welding to define a rim, assembling the rim with a web and a low carbon content steel hub, cutting teeth into the rim, and heat-treating the structure to harden the teeth, whereby the complete uniting of the abutting end surfaces of the ring permits the cutting of teeth so that one tooth coincides with the welded portion.

In witness whereof, I have hereto set my hand this 16th day of April, 1930.

AUBREY A. ROSS.